Patented Jan. 9, 1951

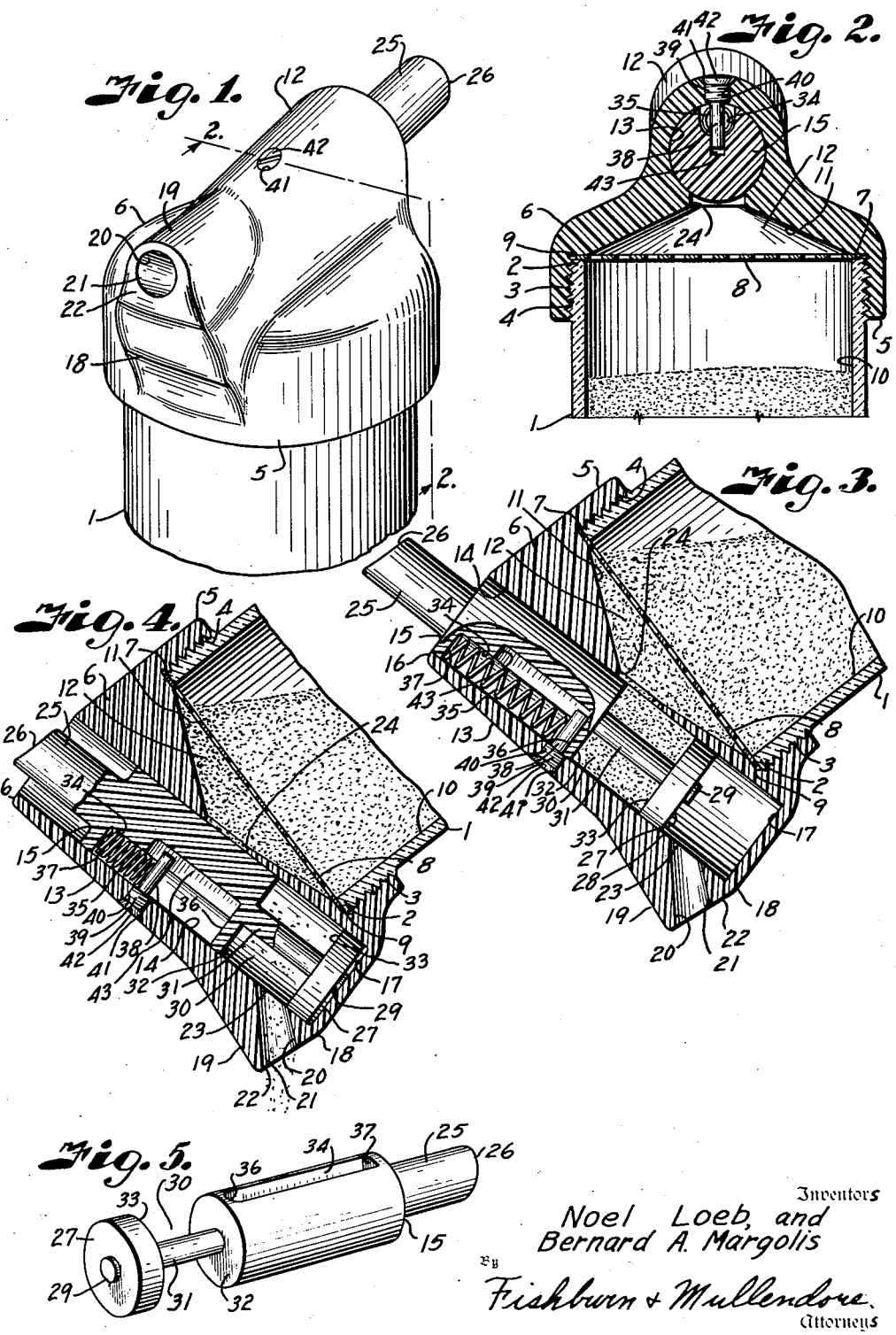

2,537,415

UNITED STATES PATENT OFFICE 2,537,415

DISPENSING COVER FOR OPEN ENDS OF CONTAINERS FOR GRANULAR MATERIAL HAVING A SPRING-BIASED RECIPROCABLE VALVE

Noel Loeb and Bernard Alexander Margolis, Kansas City, Mo.

Application July 29, 1948, Serial No. 41,188

2 Claims. (Cl. 222—340)

This invention relates to dispensing devices and more particularly to a dispenser for sugar, powdered soap, and the like, wherein the outlet and dispensing passages and moving parts thereof are rendered accessible or easily removable for cleaning and sterilization.

The objects of the present invention are to provide a receptacle in combination with a reciprocable valve assembly in the cover therefor for dispensing a predetermined quantity of sugar or other dry commodities upon each reciprocation of said valve; to provide a dispenser in a receptacle cover of neat, compact and streamlined appearance; to provide a dispenser of the minimum number of parts which are assembled and retained in operative position by a single member; to provide a plunger type dispenser of large capacity and a small length to adapt same for incorporation in the cover of a sugar receptacle such as used on tables and counters in eating places; and to provide an attractive yet simple, reliable and efficient dispenser which is easily disassembled, cleaned and sterilized.

In accomplishing these and other objects of the present invention, we have provided improved details of structure, the preferred form of which is illustrated in the accompanying drawings, wherein:

Fig. 1 is a perspective view of a dispenser embodying the features of the present invention and incorporated in the cover of a receptacle.

Fig. 2 is a vertical transverse sectional view through the dispenser, cover and receptacle on the line 2—2, Fig. 1.

Fig. 3 is a vertical section longitudinally of the dispenser plunger and illustrating the receptacle tipped to fill the metering cavity of said plunger.

Fig. 4 is a sectional view similar to Fig. 3 showing the dispensing plunger in material discharge position.

Fig. 5 is a detail perspective view of the dispensing plunger.

Referring more in detail to the drawings:

1 designates a receptacle for containing a commodity to be dispensed such as sugar, powdered soap and the like. Any suitable receptacle may be used to accommodate the device for performing the requirements of any particular installation. In the illustrated instance, the portion of the receptacle shown is similar to the containers of sugar and the like on counters and tables of eating places. The upper end 2 of the receptacle is open and provided with external threads 3 adapted to engage internal threads 4 in a depending flange 5 of a cover 6 which closes the receptacle and contains the dispensing apparatus. The threaded bore of the flange 5 preferably terminates in a shoulder 7 adapted to engage the upper surface of a perforated plate 8 of such size that the peripheral edge 9 thereof rests on the end of the receptacle and is clamped thereto by said shoulders 7 when the cover 6 is threaded onto the receptacle 1. The shoulder 7 terminates on a diameter substantially the same as the bore 10 of the upper end of the receptacle in upwardly and inwardly sloping walls 11 to form a substantially frustro-conical chamber 12 above the perforated plate 8.

The cover may be of plastic or other suitable material for use in connection with edible commodities and is preferably of a suitable material whereby the cover may be molded. Preferably integral with the cover 6 and arranged substantially diametrically thereof is a boss 13 having a bore 14 for slidably receiving a plunger or valve 15. The bore 14 is open at one end 16 and sloped at an angle to the axis of the receptacle whereby the closed end 17 is closer to the open end of the receptacle.

In sugar dispensers and the like it is desirable that each complete reciprocation of the plunger will dispense substantially one teaspoonful of sugar, and in order to keep the transverse section of the plunger and boss 13 small and adapt same for an attractive appearance as a part of the cover, the closed end of the bore 14 preferably projects beyond the side of the flange 5 as at 18. The upper portion of the boss 13 adjacent the closed end of the bore is provided with a raised portion 19 having an outlet bore 20 arranged at an angle to the axis of the bore 14 and terminating in an opening 21 in the end face 22 of the raised portion 19, said bore 20 intersecting the bore 14 in spaced relation to the closed end 17 as at 23. The bore 14 is preferably circular in cross-section but may be of any suitable geometric shape and is provided with a passageway 24 connecting the bore with the chamber 12 adjacent the axis thereof to provide for flow of the commodity being dispensed from the receptacle to the bore, as later described.

The plunger 15 is of the same transverse contour as the bore 14 and adapted to closely engage the walls thereof to prevent passage of any of the commodity between the contacting surfaces of the plunger and bore. When the plunger is in retracted position the portion thereof of the same size as the bore 14 terminates substantially flush with the open end 16 of said bore and is provided with a reduced extension 25 of slightly longer length than the longitudinal movement of the plunger in the dispensing operation to provide for engagement of the operator's finger or thumb in the operation of the plunger, the end of the extension preferably being sloped and/or recessed, as at 26, to facilitate contact between said extension and the operator's finger or thumb. The plunger preferably extends inwardly from the open end 15 of the bore and is of suitable length whereby the inner end 27 of the plunger is spaced from the bore 20 as at 28. The inner end of the plunger is provided with a projection 29 adapted to engage the closed end 17 of the bore 14 at the end of the dispensing movement of the plunger, the projection 29 being small to provide slight clearance between the end 27 of the plunger and the closed end 17 of the bore.

Spaced from the end 27 of the plunger 15 is a metering and dispensing aperture or cavity 30, said cavity preferably being formed by a groove in the periphery of said plunger of such size that said groove will contain approximately one teaspoonful of the commodity being dispensed. It is preferable that the groove be of such size that the portions of the plunger on each side thereof are connected by a small shank 31 to provide maximum capacity with sufficient strength to prevent breakage of the plunger in the operation of the dispenser or in the cleaning or sterilization thereof. The cavity 30 is so located relative to the passage 24 and the outlet bore 20 that on forward movement of the plunger the rear end 32 of said cavity closes the passage 24 prior to the forward end 33 of said cavity effecting any opening of the outlet 20. In other words, longitudinal spacing between the adjacent edges of the opening 23 and the passage 24 is slightly greater than the longitudinal length of the groove 30 whereby at no time will there be a flow from the receptacle to the outlet except under control of the metering portion of the plunger. When the plunger is in dispensing position as illustrated in Fig. 4, it is preferable that the forward portion 33 of the cavity 30 align with the forward edge of the outlet opening 23.

In order to align the plunger and provide limit of the movement thereof, a groove 34 is preferably provided in the upper portion thereof to receive a spring 35, said groove 34 having ends 36 and 37 adjacent to and short of the cavity 30 and the end of the plunger adjacent the opening 16 respectively, the spring 35 having one end engageable with the end 37 and the other end engages the shank 38 of the screw 39 threadedly engaging a threaded bore 40 in the upper portion of the boss 13. The bore 40 is preferably countersunk, as at 41, to receive the head 42 of said screw, and is preferably located relative to the bore 14 whereby the shank 38 engages the end 36 of the groove 34 when the plunger is in retracted position. The shank 38 is of sufficient length to extend into a guide groove 43 located in the bottom of the groove 34, said groove 43 being substantially the same width as the diameter of the shank to form a guide for the plunger.

The dispenser is assembled by placing the spring 35 in the groove 34 and inserting the plunger 15 into the bore 14 with the groove 34 in alignment with the threaded bore 40. The plunger is moved inwardly until the rear edge of the large portion thereof is flush with the open end 16 of the bore 14. The screw 39 is then placed in the threaded bore 40, and due to the spring 35 being slightly shorter when in extended condition than the grooves 34 and that end 36 of said groove being formed on a radius, the shank 38 will enter said groove between the end 36 thereof and the spring. The screw is then threaded into the bore 40 until the shank 38 enters the guide groove 43 to maintain the plunger in selected alignment during operation. The commodity to be dispensed is then placed in the receptacle 1 and the perforated plate 8 placed on the open end 2 thereof. The cover 6 is threaded on the threads 4 of the receptacle until the shoulder 7 engages the plate 8 to retain said plate against movement and the cover on said receptacle. The dispenser is then ready for use.

When it is desired to obtain some of the commodity from the receptacle, it is picked up and tipped as illustrated in Fig. 3 and the finger or thumb placed on the extension 25 of the plunger. The tilting action effects flow of the commodity to be dispensed through the apertures in the perforated plate 8 into the chamber 12 where it flows through the passage 24 into the cavity 30 of the plunger filling the space defined by said cavity and the bore 14. Pressure on the extension 25 moves the plunger toward the closed end 17 of the bore 14 and the end 32 of the cavity 30 passes the passage 24 to close same prior to the end 33 of the cavity 30 passing the edge of the outlet opening 20. Continued forward movement of the plunger provides communication between the cavity 30 and the outlet opening 20 into a position as shown in Fig. 4 whereby the commodity in the cavity 30 will be discharged through the opening 20.

As illustrated in Fig. 4, dispensing movement of the plunger 15 compresses the spring 35 between the end 37 of the groove 34 and the shank 38 of the screw 39, whereby release of pressure on the plunger permits the spring to effect retraction of said plunger, and move same rearwardly into the position shown in Fig. 3 whereby the commodity may again flow into the cavity 30 and the device is again ready for dispensing another metered quantity of said commodities.

At regular intervals it is desirable that the dispenser of an edible commodity be sterilized and cleaned. Cleaning is effected by unscrewing the cover 6 from the receptacle 1 and removing the screw 39 from the bore 40. The plunger 15 may then be retracted from the bore 15 and the spring lifted from the groove 34. All of the parts are then disassembled and may be placed in hot water or other sterilizing material and all of the passageways and grooves are readily accessible for any cleaning that is required. After sterilization the dispenser may be reassembled as above described and is then ready for additional accurate dispensing of the commodity in the receptacle 1.

It is believed obvious that we have provided an attractive, simple, reliable and efficient dispenser which is easily cleaned and sterilized, that readily adapts itself to use on receptacles containing sugar and the like.

What we claim and desire to secure by Letters Patent is:

1. A dispensing device comprising, a receptacle having a discharge pasage intersected by a valve bore and an outlet from said bore, said outlet being offset longitudinally of the valve bore from the discharge passage, a cylindrical valve slidably mounted within the valve bore and having a portion of reduced diameter intermediate its length forming a metering cavity therein normally positioned to register with the discharge passage of said receptacle, said valve being movable within said bore to register said metering cavity with said outlet, said valve having a longitudinal groove therein oppositely disposed relative to the discharge passage and spaced from the metering cavity and confined within the valve bore, a spring in said groove and having one end engaging the end of the groove remote from the metering cavity, and means removably secured in the receptacle and extending into the groove and normally having engagement with the end of said groove adjacent the metering cavity and the adjacent end of said spring whereby pressure on the valve will compress the spring to return the valve to normal position upon release of said pressure, said means serving as a stop to retain the valve in normal position.

2. A dispensing device comprising, a receptacle having an opening therein, a closure member for said opening secured to said receptacle, said closure member having a discharge passage communicating with the receptacle and intersected by a valve bore and an outlet from said bore, said outlet being offset longitudinally of the valve bore from the discharge passage, a dispensing valve member reciprocable in said bore and having a reduced portion intermediate its length forming a metering aperture therein normally positioned to register with the discharge passage and movable within the bore to register said aperture with said outlet, said valve member having a groove longitudinally thereof spaced from the metering aperture and confined within the valve bore, said groove being oppositely disposed relative to the discharge passage, said closure member having an opening aligned with the groove, means removably secured in said opening in the closure member and adapted for engaging the end of the groove in the valve member adjacent the metering aperture for limiting the retractive movement thereof, and resilient means in said groove within the confines of the bore having engagement with the end of the groove in the valve remote from the metering aperture and the valve movement limiting means for retracting the valve member from discharge position, said valve member having a second groove located inwardly of, and in adjacent communication with, the first named groove and engaged by the valve limiting means for maintaining the valve aperture in alignment with the discharge passage and outlet.

NOEL LOEB.
BERNARD ALEXANDER MARGOLIS.

REFERENCES CITED

The following references are of record in the file of this patent:

UNITED STATES PATENTS

| Number | Name | Date |
|---|---|---|
| 753,597 | Long | Mar. 1, 1904 |
| 889,306 | Hoffman et al. | June 2, 1908 |
| 931,984 | Backman | Aug. 24, 1909 |
| 998,389 | Penick et al. | July 18, 1911 |
| 1,067,523 | Kendall | July 15, 1913 |
| 1,174,674 | Byer | Mar. 7, 1916 |
| 1,356,837 | Stegmaier | Oct. 26, 1920 |
| 1,880,823 | Cooper | Oct. 4, 1932 |
| 1,904,756 | Wooster | Apr. 18, 1933 |